(12) United States Patent
Zhou et al.

(10) Patent No.: US 12,195,334 B2
(45) Date of Patent: Jan. 14, 2025

(54) SYSTEMS OF PRODUCING HYDROGEN AND BIOCHAR FROM BIOMASS ASSISTED BY IRON AND STEEL SLAG EXTRACT

(71) Applicant: GREENORE HOLDING CO., Wilmington, DE (US)

(72) Inventors: Xiaozhou Zhou, Shanghai (CN); Huangjing Zhao, Shanghai (CN)

(73) Assignee: GREENORE HOLDING CO., Wilmington, DE (US)

( * ) Notice: Subject to any disclaimer, the term of this patent is extended or adjusted under 35 U.S.C. 154(b) by 899 days.

(21) Appl. No.: 17/334,858

(22) Filed: May 31, 2021

(65) Prior Publication Data

US 2021/0380406 A1 Dec. 9, 2021

(30) Foreign Application Priority Data

Jun. 5, 2020 (CN) .......................... 202010506856.1

(51) Int. Cl.
*B01J 8/18* (2006.01)
*B01D 36/02* (2006.01)
(Continued)

(52) U.S. Cl.
CPC ................ *C01B 3/02* (2013.01); *B01D 36/02* (2013.01); *B01J 8/1836* (2013.01); *B01J 8/24* (2013.01); *B01J 23/745* (2013.01); *B01J 37/08* (2013.01); *B01J 37/18* (2013.01); *C01B 32/05* (2017.08); *C10B 53/02* (2013.01); *C10B 57/06* (2013.01);
(Continued)

(58) Field of Classification Search
CPC ....... C01B 3/02; C01B 32/05; C01B 2203/04; C01B 32/60; B01D 36/02; B01J 8/1836; B01J 8/24; B01J 23/745; B01J 37/08; B01J 37/18; C10B 53/02; C10B 57/06; C10B 57/10; C10B 57/14; C22B 1/16;
(Continued)

(56) References Cited

U.S. PATENT DOCUMENTS

| 8,974,757 | B2 * | 3/2015 | Park ........................ C01B 3/105 423/220 |
| 2015/0033812 | A1 * | 2/2015 | Park ........................ C01D 7/07 71/31 |

FOREIGN PATENT DOCUMENTS

| CN | 1475432 A | * | 2/2004 |
| CN | 207130292 U | * | 3/2018 |

OTHER PUBLICATIONS

CN-1475432-A—machine translation (Year: 2024).*
CN-207130292-U—machine translation (Year: 2024).*
Machine translation (Year: 2024).*

* cited by examiner

*Primary Examiner* — Huy Tram Nguyen
(74) *Attorney, Agent, or Firm* — Bayramoglu Law Offices LLC

(57) ABSTRACT

Systems of producing hydrogen and biochar from biomass assisted by iron and steel slag extract include: a pretreatment system that the reactants, including the biomass, iron-based catalyst and alkaline reagent, are pretreated and fully mixed at specific ratios in the pretreatment system; thermal reactor that the mixed reactants from the pretreatment device are transferred into and fully reacted in the thermal reactor; a solid residue collector that the solid residue is collected by the solid residue collector at the discharge outlet of the thermal reactor after the reacted mixture is separated; a gas collection system that he generated hydrogen-based gas is collected by the gas collection system from the exhaust port of the thermal reactor.

18 Claims, 3 Drawing Sheets

(51) Int. Cl.
*B01J 8/24* (2006.01)
*B01J 23/745* (2006.01)
*B01J 37/08* (2006.01)
*B01J 37/18* (2006.01)
*C01B 3/02* (2006.01)
*C01B 32/05* (2017.01)
*C10B 53/02* (2006.01)
*C10B 57/06* (2006.01)
*C10B 57/10* (2006.01)
*C10B 57/14* (2006.01)
*C22B 1/16* (2006.01)

(52) U.S. Cl.
CPC .............. *C10B 57/10* (2013.01); *C10B 57/14* (2013.01); *C22B 1/16* (2013.01); *C01B 2203/04* (2013.01)

(58) Field of Classification Search
CPC .. C22B 1/245; Y02P 20/52; C10J 2300/0903; C10J 2300/0909; Y02E 50/10
USPC ....................................................... 422/140
See application file for complete search history.

SYSTEMS OF PRODUCING HYDROGEN AND BIOCHAR FROM BIOMASS ASSISTED BY IRON AND STEEL SLAG EXTRACT

CROSS REFERENCE TO THE RELATED APPLICATIONS

This application is based upon and claims priority to Chinese Patent Application No. 202010506856.1, filed on Jun. 5, 2020, the entire contents of which are incorporated herein by reference.

TECHNICAL FIELD

The present invention relates to systems of producing hydrogen and biochar from biomass assisted by iron and steel slag extract, which is derived from the technology of Carbon Capture, Utilization and Sequestration (CCUS).

BACKGROUND

The current global energy supply still dominantly depend on fossil fuels, but the utilization of fossil fuels as the major energy sources has brought related issues of carbon emission and climate change. Therefore, hydrogen as a carbon free alternative energy has broad market potential. However, based on current technology development, the most economical and practical method for hydrogen production is based on the decomposition of fossil fuels which the carbon footprint of this process remains high and existing problems of carbon emission derived from fossil fuels remains unsolved.

Under such a backdrop, the iron and steel industry, as one of the largest carbon emitters, have proposed a carbon free manufacturing process which hydrogen is used as an alternative reducing gas. At the industrial scale, the current carbon free technics to produce hydrogen are based on electrolysis of water by using sustainable energy such as wind power, hydropower, solar power and etc. Most iron and steel mills are located on the coastal areas or by the riverside due to industrial needs where aquatic biomass such as seaweed and kelp or terrestrial biomass such as reeds, straw, dead wood, etc. are abundant. Therefore, technical advances are required to make full use of the nearby aquatic and terrestrial biomass resources in the process of hydrogen generation.

However, the production of hydrogen from biomass also has a number of problems such as high parasitic energy consumption and low purity of hydrogen products which has typically gone through the process of gasification, high temperature decomposition, sub/supercritical heat treatment and etc. Of those methods, production of hydrogen from biomass by using alkaline reagent has been paid great attention universally in recent years while several technical issues also have been exposed at the industrial scale. Sodium hydroxide, the traditional alkaline reagent, is normally expensive. Moreover, the carbon footprint also remains high and the reliance on nickel (Ni) catalyst leads to a higher overall cost of chemicals and recycling process. Searching for a cost-effective catalyst with sufficient supply which can be used in the production of hydrogen from biomass by using alkaline reagent is also a challenge. In addition, the biochar in the solid residue, which is produced as a by-product during the process, contains sodium carbonate which is highly soluble in water. It limits the direct use of solid residues in the soil remediation. Due to the requirement of high-purity of hydrogen for fuel cells, which is the main end product derived from this method, the cost of separation and purification is not affordable yet. Therefore, more practical applications and separation methods of hydrogen is required to be further developed and improved for its further use as one of the sustainable energy sources.

In order to build a sustainable industrial system of iron and steel industry, a multi-phase recycle scheme of material, such as gaseous, solid and water resources, is necessary to be established. Therefore, there are two technical problems which need to be solved urgently. One is how to make full use of the by-products generated from iron and steel slag during multi-stage reaction and separation systems of a carbon dioxide based hydrometallurgical process, which is intended to economically improve the whole flow in the perspective of carbon capture, utilization and sequestration. The other is how to make full use of abundant biomass waste such as reeds, straws, dead leaves, algae and food residual and combine the process with the by-products from the multi-stage reaction.

The U.S. Pat. No. 8,974,757B2 discloses methods and systems for synthesizing iron-based materials and sequestering carbon dioxide. In some embodiments, the methods include the following: increasing a pH of the solution to cause precipitation of iron oxide from the solution thereby generating the first source of $Fe_2O_3$ which is an iron-based catalysts and chemical looping sorbents; the pH swing process reacting the carbonate-forming element in the solution with a first source of carbon dioxide to produce a carbonate thereby sequestering the carbon dioxide; oxidizing the first source of $Fe_2O_3$ with a carbonaceous fuel thereby generating a second source of carbon dioxide and iron; the iron-based chemical looping sorbents are regenerated via oxidation with steam to generate hydrogen; the oxidizing of the iron with steam thereby generating hydrogen and an iron oxide.

The U.S. patent No. US20150033812A1 discloses methods and systems for the Co-generation of gaseous fuels, biochar, and fertilizer from biomass and biogenic wastes. In some embodiments, the methods include the following: a pretreatment module for mixing at least one of a dry solid or liquid or liquid hydroxide and catalysts with a biomass to form a biomass mixture; an alkaline hydrothermal treatment reactor for heating the biomass mixture until the hydroxide and the biomass react to produce hydrogen, carbonate and biochar, potentially a fertilizer; a hydroxide regeneration reactor for calcining the carbonate or performing double replacement reactions of the carbonate to produce sequestration-ready carbon dioxide and a hydroxide; the alkaline hydrothermal treatment reactor in connection with the pretreatment module and the hydroxide regeneration reactor in connection with alkaline hydrothermal treatment reactor. The added catalyst is nickel-based catalyst which is expensive and hard to recycle.

SUMMARY

In order to overcome the technical difficulties and limitations addressed above, the present invention proposes systems of producing hydrogen and biochar from biomass assisted by iron and steel slag extract.

To solve the technical issues addressed above, the following modes are proposed below:

The present invention with regard to systems of producing hydrogen and biochar from biomass assisted by iron and steel slag extract comprises:

Pretreatment system: the reactants, including the biomass, iron-based catalyst and alkaline reagent, are pretreated and fully mixed at specific ratios in the pretreatment system.

Thermal reactor: the mixed reactants from the pretreatment device are transferred into the thermal reactor and then fully reacted.

Solid residue collector: the solid residue is collected by the solid residue collector at the discharge outlet of the thermal reactor after the reaction.

Gas collection system: the generated hydrogen-based gas is collected by the gas collection system from the exhaust port of the thermal reactor.

Furthermore, the system addressed above also comprises a biomass dehydration treatment unit which is included in the pretreatment system.

Furthermore, in the system addressed above, the iron-based catalyst is reduced in hydrogen at 500° C. for 2 hours in the pretreatment system.

Furthermore, in the system addressed above, the biomass and alkaline reagents are mixed at a specific stoichiometric ratio which the ratio is 1 mole to 5 mole according to the theoretical molecular formula and the chemical reaction equation. The amount of iron-based catalyst added in the reaction is between 5 wt % and 15 wt %.

Furthermore, in the thermal reactor addressed above, the mixture is fully reacted either at 500° C. for 1 hour or at 300° C. for 2 hours.

Furthermore, in the system addressed above, if the biomass is relatively dry, additional steam is needed for keeping the humidity of the reaction environment between 10% and 30%.

Furthermore, in the system addressed above, the solid residue is a mixture of biochar, calcium and magnesium carbonates and iron-based catalyst.

Furthermore, the system addressed above also comprising an iron-making sintering system where solid residue is mixed with the raw material at the ratio of no more than 30% by total weight for the sintering preparation and the blast furnace reduction to follow.

Furthermore, the system addressed above also comprises a gas separation and purification system where the hydrogen-based gas collected by gas collection system is transferred in for separation and purification in order to obtain a high-purity hydrogen product.

Furthermore, the system addressed above also comprises a mixed gas reuse system where the hydrogen-based gas collected by gas collection system is transferred into an iron-making blast furnace for direct reduced iron reaction, involving the processes of heating, reduction and etc.

Furthermore, the pretreatment system addressed above also comprises an iron-based catalyst collecting system, which is composed of:

Pre-washing device: the feedstock, such as industrial solid waste, mineral and mine tailings, is continuously added and fully mixed with auxiliary reagents and water at a specific ratio into the pre-washing device.

Reactor: the washed slurry from the pre-washing device is continuously transferred into the reactor by using a pump unit. Carbon dioxide is continuously bubbled into the reactor under a specific pressure in order to be fully mixed and reacted with the washed slurry. The treated slurry is continuously discharged from the reactor.

Multistage solid-liquid separator: the treated slurry from the reactor is filtered by a multistage solid-liquid separator, where the unreacted solid particles obtained are recycled as feedstock into the next stage of reaction and separation.

Purifier: besides the target calcium and magnesium ions, the filtrate from multistage solid-liquid separator containing other impurities such as ferrite ion is continuously transferred into purifier after the multistage solid-liquid separator. Precipitation is performed to remove impurities from the filtrate by physically and/or chemically changing the pH value of the filtrate. The iron-based catalyst can be obtained by collecting the iron-containing impurities.

Furthermore, the pretreatment system addressed above also comprises an alkaline reagent separation system, a product preparation unit and a thermal decomposition unit. Product preparation unit can produce Ca/Mg based products based on the filtrate containing target ions of calcium and magnesium filtered by the multistage solid-liquid separator. The Ca/Mg based products are calcined and decomposed in a thermal decomposition unit to form a Ca/Mg alkaline reagent.

Compared with current technics, the present invention has the technical advantages as shown below:

The present invention utilizes the Ca/Mg based reagent contained in the iron and steel slag extract as one of the reactants to absorb the moisture in biomass which is beneficial to the fracture of the biomass structure and to the production rate of hydrogen and simplifies the pretreatment process of biomass.

The present invention extracts iron-based catalyst from stainless steel slag to replace nickel-based catalyst. Although the overall conversion rate of the reactions using iron-based catalyst is lower compared to that using nickel-based catalyst, the iron-based catalyst has the advantages of low price and mass production since the iron-based catalyst is a by-product from the iron and steel slag.

The present invention generates a solid residue as a by-product from producing hydrogen using biomass. The solid residue can be mixed with the raw materials in the sintering system of the iron-making streamline. It can be used in the reduction reaction in the blast furnace as a substitute of reaction reagents comprising coking coal, slag-making agents limestone/dolomite and iron ore. The biochar in the solid residue can be used as a substitute or a supplement of coking coal as a reducing reagent. Meanwhile, the calcium and magnesium based carbonates in the solid residue can also be fully recycled as a slag-making reagent. As a substitute of iron ore, the iron-based catalyst in the solid residue will participate in the reduction reaction of the blast furnace-based iron-making process.

The present invention generates a hydrogen-based gas mixture containing other gases as CH-based gas and CO-based gas from the hydrogen production reaction using biomass. The mixed gases generated from the reaction can be applied directly on site in the iron ore reduction, involving the processes of heating, reduction and etc in addition to be prepared as a high-purify hydrogen via separation, purification and extraction which will lead to a higher cost.

BRIEF DESCRIPTION OF THE DRAWINGS

In accordance with the following detailed description of a non-restrictive embodiment's figure shown below, the improvement of the present invention will be explicitly illustrated in terms of features, purposes and advantages.

DETAILED DESCRIPTION OF THE EMBODIMENTS

To further explicitly demonstrate the purpose, characteristics and performance of this application, a further explanation will be combined with attached figures in order to fully illustrate the detailed concept, concrete arrangement and technical purposes of the system.

Figure 1:
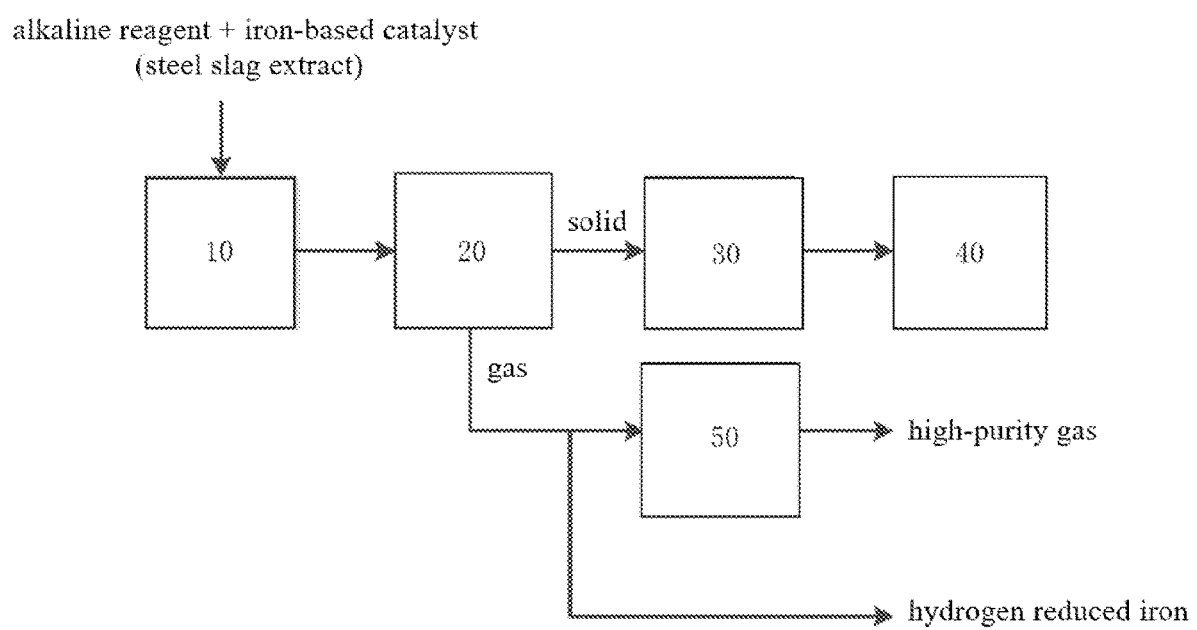
FIG. 1: Process Flowsheet of the Present Invention as Systems of Producing Hydrogen and Biochar using Biomass assisted by Iron and Steel Slag Extract.
Figure 2:
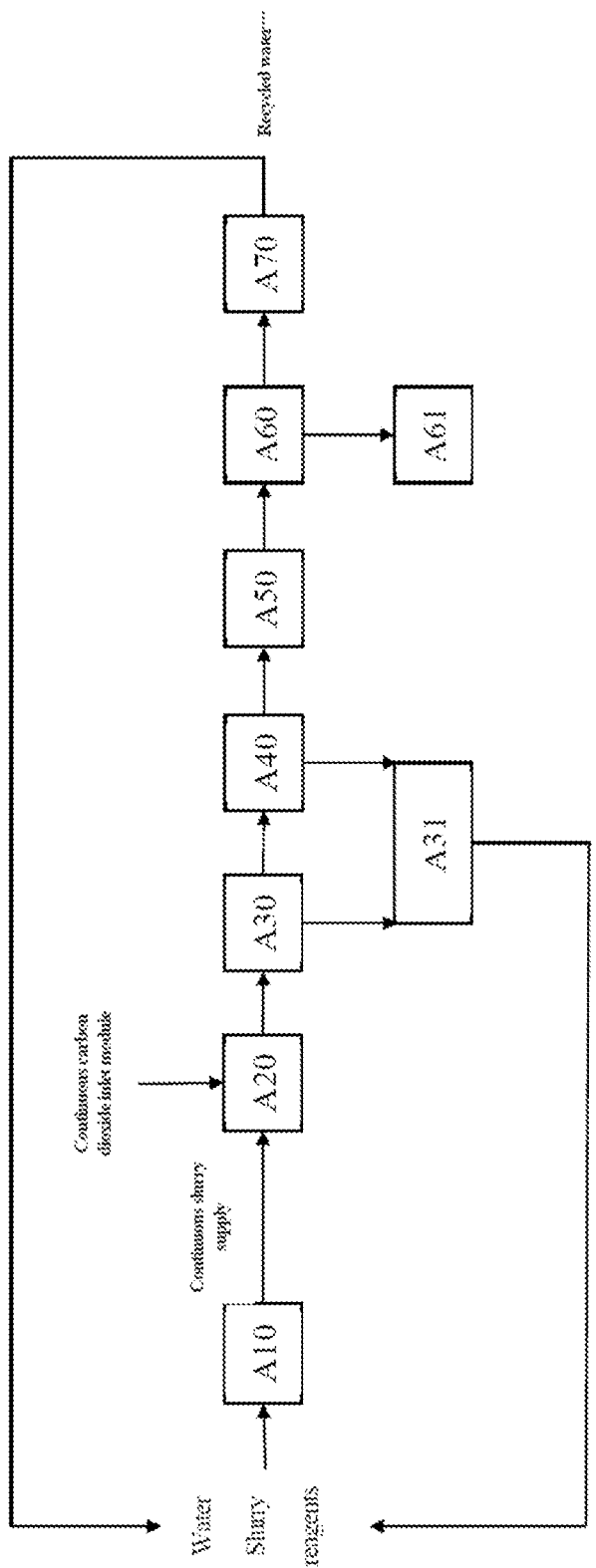
FIG. 2: Process Flowsheet of the Present Invention as the Iron-based Catalyst Collection System.

With respect to one of the embodiments for systems of producing hydrogen and biochar using biomass assisted by iron and steel slag extract shown in FIG. 1, the flowsheet is described as follows:

Pretreatment system (10): the reactants, including the biomass, iron-based catalyst and alkaline reagent, are pretreated and fully mixed at a specific ratio in the pretreatment system.

Thermal reactor (20): the mixed reactants are fully reacted in the thermal reactor.

Solid residue collector (40): the solid residue is collected by the solid residue collector (40) at the discharge outlet of the thermal reactor (20) after the reacted mixture is separated.

Gas collection system: the generated hydrogen-based gas is collected by the gas collection system from the exhaust port of the thermal reactor (20).

In this embodiment, the iron and steel slag extract are prepared by a carbon dioxide based hydrometallurgical process.

In this embodiment, the Ca/Mg alkaline reagent contained in the iron and steel slag extract as one of reactants is used to absorb the moisture in the biomass which is beneficial to the fracture of the biomass structure and the production rate of hydrogen and simplifies the pretreatment process of biomass. In addition, the iron-based catalyst extracted from the stainless steel slag are used to replace the nickel-based catalyst. Although the overall conversion rate of the reactions using iron-based catalyst is lower compared to that using nickel-based catalyst, the iron-based catalyst has the advantages of low price and mass production rate since the iron-based catalyst is a by-product from the iron and steel slag.

Furthermore, the pretreatment system (10) addressed above also comprises a biomass dehydration treatment unit. The moisture content of the biomass can be adjusted by oven drying, freeze drying and other techniques.

Pretreatment system (10) also comprises a 2-hour reduction pretreatment of iron-based catalyst in hydrogen at 500° C.

In this embodiment, the chemical equation of the reaction using the molecular formula of biomass $C_5H_{10}O_5(s)$ as an example is shown blow:

$$C_5H_{10}O_5(s)+5Ca(OH)_2(s)\rightarrow 10H_2(g)+5CaCO_3(s)$$

The addressed biomass and alkaline reagents are mixed at a specific stoichiometric ratio which is 1 mole to 5 mole according to the theoretical molecular formula and chemical reaction equation. The amount of iron-based catalyst added in the reaction is between 5% and 15% by weight of the mixture.

In the thermal reactor (20), the mixture is fully reacted either at 500° C. for 1 hour or at 300° C. for 2 hours in order to ensure the reactants are fully mixed and reacted.

Furthermore, if the biomass is relatively dry, additional steam is needed for keeping the humidity of the reaction environment which is between 10% and 30%.

The solid residue is a mixture of biochar, calcium and magnesium carbonates and iron-based catalyst.

This embodiment also comprises an iron-making sintering system (40) where solid residue is mixed with the raw material at the ratio of no more than 30% by total weight for the sintering preparation. The solid residue, which is a mixture of biochar, calcium/magnesium carbonates and iron-based catalyst, can be fully used in the sintering process and the blast furnace reduction reaction.

This embodiment also comprises a gas separation and purification system (50) where the hydrogen-based gas collected by the gas collector system is transferred in for separation and purification in order to obtain high-purity hydrogen product.

Furthermore, this embodiment also comprises a mixed gas reuse system where the hydrogen-based gas collected by the gas collector system is transferred into an iron-making blast furnace for direct reduced iron reaction, heating reaction, reduction reaction and etc. The hydrogen-based gas collected by the gas collection system contains impurity gases such as $CH_4$, $C_2H_4$, $C_2H_6$, CO, $CO_2$ and ect., which can be used as fuels in the furnace to heat up the direct reduced iron reaction. A small portion of CO can also be used to participate in reduction reaction directly. The reaction temperature is between 750° C. and 1000° C. which is more energy efficient comparing with the temperature of traditional furnace reaction which is higher than 1500° C.

The chemical equation of the reduced iron reaction using hydrogen as a reactant is shown below:

$$3Fe_2O_3+H_2\rightarrow 2Fe_3O_4+H_2O$$

$$Fe_3O_4++H_2\rightarrow 3FeO+H_2O$$

$$FeO+H_2\rightarrow Fe+H_2O$$

Furthermore, in this embodiment, the pretreatment system addressed above also comprises an iron-based catalyst collecting system, which is composed of:

Pre-washing device (A10): the feedstock, such as industrial solid waste, mineral and mine tailings, is continuously added and fully mixed with auxiliary reagents and water at a specific ratio into the pre-washing device (A10).

Reactor (A20): the washed slurry from the pre-washing device (A10) is continuously transferred into the reactor (A20) by a pump unit. Carbon dioxide is bubbled into the reactor (A20) under a specific pressure in order to be fully mixed and reacted with the washed slurry. The treated slurry is continuously discharged from the reactor (A20).

Multistage product preparation unit: the treated slurry from the reactor (A20) is filtered by multistage solid-liquid separators, where the unreacted solids are recycled as feedstock into the next stage of reaction and separation.

Purifier (A50): Besides the target calcium and magnesium ions, the filtrate from the multistage product preparation unit contains other impurities such as ferrite ion. The filtrate from multistage product preparation unit is continuously transferred into the purifier (A50). Precipitation is performed to remove impurities from the filtrate by physically and/or chemically changing the pH value of the solution. The iron-based catalysts can be obtained by collecting iron-containing impurities.

The pretreatment system also includes a by-product preparation unit (A70), where the filtrate from the multistage separator containing target ions of calcium and magnesium is continuously added in order to generate Ca/Mg based products, and a water recirculation device, where remaining liquor is recirculated to the system after that by-products are collected.

In this embodiment, the whole system is able to continuously and consistently react at the maximum capacity through continuous slurry feeding and $CO_2$ bubbling into the reactor (A20) which also enables multistage circulating reaction. Meanwhile, the emissions and losses of carbon dioxide derived from the discharging process during the batch reaction can be reduced. Moreover, $CO_2$ loss and unnecessary time loss derived from the repetitive feeding and discharging can be minimized which is the current technical limitation led to the underperformance of the whole system.

Furthermore, the added feedstock, such as industrial solid waste, mineral and mine tailings, added into the pre-washing device (A10) should be less than 10% by weight of the slurry and the added auxiliary reagents should be less than 5% by weight of the slurry. In practical application, the proportion of auxiliary reagents can be adjusted depending on actual component of the feedstock.

The industrial solid waste addressed above comprises steel slag, iron slag, fly ash, bottom ash, red mud, waste concrete/cement, tailings and etc.

The feedstock addressed above comprises various types of calcium and magnesium bearing minerals.

The auxiliary reagents addressed comprise at least one of acids, salts or the combination containing organic acid anions. The anions or acids consist of: oxalate, citrate, picolinate, gluconate, glutamate, formic acid, acetic acid, propionate, valerate, lactate, succinate, phosphate, pyrophosphate, ascorbic acid, and phthalic acid.

The added water is fresh water or the recycled water treated by the water recirculating device.

The added carbon dioxide is continuously bubbled into the reactor (A20) under a pressure of less than 100 bars and is fully mixed and reacted with the washed slurry, where the whole reaction temperature is controlled under 90° C. This embodiment provides a continuous leaching process of target ions by adjusting the pressure of carbon dioxide bubbling process, ratio of auxiliary reagents and reaction temperature, which eliminates the usage of strong acid or highly corrosive acid such as nitric acid, hydrochloric acid, sulfuric acid and hydrofluoric acid.

In this embodiment, the bubbled carbon dioxide is from the flue gas generated by power plants, blast furnaces, basic oxygen furnaces/converters, refining furnaces, lime kilns, coal-to-chemicals manufacturing plants or petrochemical manufacturing plants. The content of carbon dioxide varies between 15% and 98% based on the source of flue gas.

Furthermore, the multistage product preparation unit addressed above comprises a primary coarse separation module (A30) and a secondary fine separation module (A40), where the size of particles separated by the primary coarse separator module (A30) is larger than 5-10 μm and the size of particles separated by the secondary fine separator module (A40) is smaller than 1 to 5 μm. In particular, the combined reaction time of each separation module in total is less than 1 hour. This embodiment ensures that the whole system is able to continuously and consistently separate solids from the slurry at a maximum capacity through the optimized multistage solid-liquid separation processes for a wide distributed particle sizes which shortens the total separation time and increases the likelihood of the separation system to operate continuously and consistently. Technical issues of single-stage separation caused by the requirement of removing solid particles of all sized at once is minimized. Moreover, sedimentation centrifuge is proved to be inefficient in single-stage separation for particles with sizes under 5 μm which affects the maximum treatment capacity per unit time of the whole system and leads to a high energy consumption. In the case that a filter press is used in a single-stage separation, filter cloth is frequently clogged with various sizes of solid particles which also affects the maximum treatment capacity per unit time of the whole system and increases operating cost since frequent filter replacement is required.

Thereinto, the multistage solid-liquid separators can be applied comprising of either the combination of a sedimentation centrifuge and a disk-stack centrifuge, the combination of two filter press, or the combination of a sedimentation centrifuge and a filter press.

The $CO_2$ treated slurry discharged from the reactor (A20) is filtered by multistage solid-liquid separators where the unreacted solids (M31) are recycled as feedstock into the next stage of reaction and separation. The frequency of recycling the unreacted solids (M31) is less than 5 times.

Furthermore, in this embodiment, the filtrate is continuously transferred into the purifier (A50) after processing through the multistage solid-liquid separators. Besides the target ions of calcium and magnesium, the filtrate from the multistage solid-liquid separators also contains other impurities such as iron, silicon, aluminum and etc. Impurities are precipitated from the filtrate by physically and/or chemically changing the pH value of the solution through either continuously adding alkaline reagents, acid reagents, coagulant and/or flocculant which is less than 1% by weight of solution, injecting air/steam or heating the solution.

Furthermore, in this embodiment, multistage solid-liquid separators also comprise a third stage solid-liquid separation module (A60) which is arranged after the purifier (A50). The third stage solid-liquid separation module (A60) is able to continuously separate the precipitated particles from the filtrate containing target ions of calcium and magnesium by using either dish-stack centrifuge, filter press or filtration. The remaining filtrate containing target ions of calcium and magnesium is transferred into the by-product preparation unit (A70) which is described below.

Thereinto, if the remaining filtrate after third stage solid-liquid separation module (A60) is enriched with iron after passing through the third stage solid-liquid separation module, iron is collected as ferric and/or ferrous hydroxides precipitation (A61) for recycling and reusing.

The filtrate containing target ions of calcium and magnesium is transferred into by-product preparation unit (A70) to generate calcium and magnesium products which are in the formation of calcium magnesium carbonate, calcium carbonate and magnesium carbonate, calcium hydroxides and magnesium hydroxides, calcium and magnesium sulfates or calcium and magnesium nitrates.

Furthermore, the remaining liquor is recirculated to the system after the by-product is collected and the recycle frequency of water is larger than 2 times.

Figure 3:
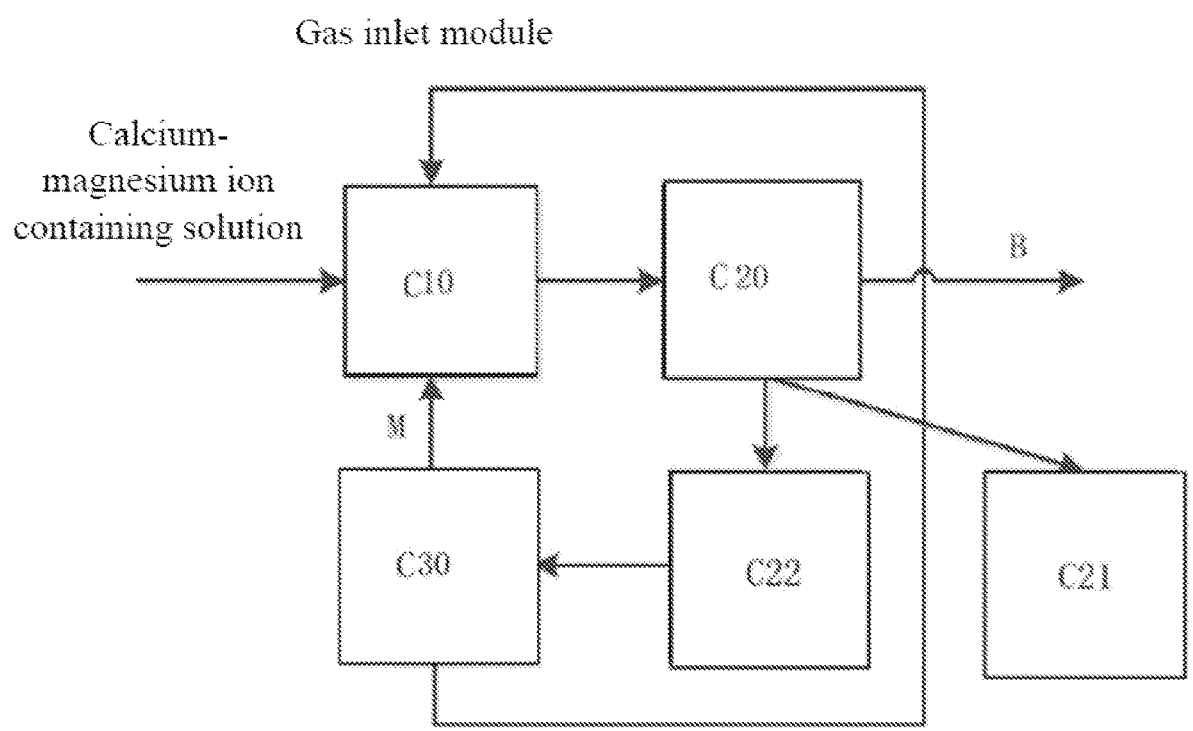
FIG. 3: Process Flowsheet of the Present Invention as the Alkaline Reagent Separation System.

In this embodiment, the pretreatment system addressed above also comprises an alkaline reagent separation system including a product preparation device (C20) and a thermal decomposition unit (C30), which is shown in FIG. 3. The filtrate from multistage separators containing target ions of calcium and magnesium is added in the product preparation device (C20) in order to generate Ca/Mg based products. The Ca/Mg based product (C22) is calcined by the thermal decomposition unit (C30) to produce a calcium and magnesium based alkaline reagent (M). The alkaline reagent (M) is recycled into the precipitation reactor (C10) for the next cycle of reaction.

The alkaline separation system addressed above also comprises a precipitation reactor (C10), the leached solution containing calcium and magnesium is continuously added and fully mixed with the alkaline reagent (M) at specific mole ratios. The precipitation reactor (C10) also comprises a $CO_2$ bubbling module where $CO_2$ is captured and recirculated from the thermal decomposition process as a supplement. The treated slurry transferred from the precipitation reactor (C10) is filtered by the product preparation unit (C20) to produce the calcium and magnesium based precipitated products (C21) and the recycled water (B) is circulated back and used in the next cycle of slurry preparation.

In this embodiment, the leached Ca/Mg containing solution is prepared by a $CO_2$-based hydrometallurgical process and the pH value of the leached solution is nearly neutral or slightly acidic (pH<7) with certain level of dissolved $CO_2$.

The leached Ca/Mg containing solution is continuously added into the precipitation reactor (C10) at a mole ratio<1 per unit time between the alkaline reagents (M) and the leached Ca/Mg containing solution. Furthermore, the $CO_2$ generated from the thermal decomposition unit (C30) is transferred back into the $CO_2$ bubbling module where $CO_2$ is captured and recirculated back into the precipitation reactor (C10) as a supplement to precipitate calcium and magnesium carbonate products.

In this embodiment, the precipitated calcium and magnesium carbonate products (C21) acquired by the product preparation unit (C20) is partially proceeded to be prepared into Ca/Mg carbonate slurry or is formulated into Ca/Mg carbonate powder by a drying module. Moreover, the rest of the precipitated calcium and magnesium carbonate products (C22) is transferred into the thermal decomposition unit (C30) for the alkaline reagents (M) preparation and the alkaline reagents (M) are recycled into precipitation reactor (C10).

Furthermore, the temperature of the calcination in the thermal decomposition unit (C30) is between 800-900° C.

Thereinto, the alkaline reagent (M) contains calcium and magnesium oxides.

The thermal decomposition unit (C30) comprises a fluidized bed unit. After dispersion in the fluidized bed, more than 99% of the Ca/Mg carbonate could have particle sizes less than 300 μm and the particle sizes after calcination are mostly less than 100 μm.

Thereinto, the density of calcium and magnesium carbonates is between $2.8 \times 10^3$ kg/m$^3$ to $2.9 \times 10^3$ kg/m$^3$ and the density of calcium and magnesium oxides is between $3.3 \times 10^3$ kg/m$^3$ to $3.4 \times 10^3$ kg/m$^3$.

During the process of calcination of calcium and magnesium carbonate products (C22) in the fluidized bed unit, the average minimum fluidization velocity of calcium and magnesium carbonate particles is $U_1$, the average minimum fluidization velocity of calcium and magnesium oxide particles is $U_2$, the entrainment velocity of calcium and magnesium oxide particles is $U_3$, and the inlet fluidizing gas velocity is $U_g$.

When $U_3 > U_g > U_1 > U_2$, the bed height of the dense phase will significantly increase after the calcination of calcium and magnesium carbonates starts. The bed height increases until the thermal decomposition of Ca/Mg carbonate particles is completed. At this point, the calcined Ca/Mg based oxide particles can be entrained and collected by increasing $U_g$.

The calcined calcium and magnesium oxide particles can be entrained and collected when $U_g > U_3 > U_1 > U_2$.

During the process of calcination in the fluidized bed, when $U_g > U_2 > U_1$, $U_g$ needs to be tuned less than $U_3$. Meanwhile, the bed height of the dense phase will significantly decrease when the thermal decomposition of Ca/Mg carbonate particles begins and will last until the thermal decomposition is completed. The calcined Ca/Mg based oxide particles can be entrained and collected by increasing $U_g$ larger than $U_3$.

Thereinto, the inlet fluidizing gas comprises hot air and optional $CO_2$ of which $CO_2$ is collected and recirculated from the $CO_2$ outlet on the top of the fluidized bed unit after the calcination process.

In this embodiment, the carbon dioxide generated from the thermal decomposition unit (C30) is transferred back into the $CO_2$ module where $CO_2$ is collected and recirculated into the precipitation reactor (C10) as a supplement to precipitate calcium and magnesium carbonates.

The present invention utilizes the Ca/Mg based reagent contained in the iron and steel slag extract as one of reactants to absorb the moisture in biomass which is beneficial to the facture of the biomass structure and the production rate of hydrogen and simplifies the pretreatment process of biomass. Moreover, iron-based catalyst is extracted from the stainless steel slag to replace nickel-based catalyst. Although the overall conversion rate of the reactions using iron-based catalyst is lower comparing with using nickel-based catalyst, the iron-based catalyst has the advantages of low price and mass production since the iron-based catalyst is a by-product from the iron and steel slag. The solid residue generated from the present invention as a by-product can be mixed with the raw materials in the sintering system of iron-making process prior to the reduction reaction of blast furnace as a substitute of reaction reagents comprising coking coal, slag-making agents limestone/dolomite and iron ore. The biochar in the solid residue can be used as a substitute or extra supplement of coking coal as a reducing reagent. Meanwhile, the calcium and magnesium based carbonates in the solid residue can also be fully recycled as a slag-making reagent. As a substitute of iron ore, the iron-based catalyst in the solid residue will participate in the reduction reaction of iron-making process in the blast furnace. The present invention also produces a hydrogen-based gas mixture containing other gases as CH-based gas and CO-based gas from hydrogen production reaction by using biomass. The mixed gas produced from the reaction can be applied directly on site in the reducing iron process, thermal reactor and reduction reaction in iron and steel mills otherwise the gas product needs to be prepared as a high-purify hydrogen through the process of separation, purification and extraction which will increase the total cost.

The embodiment addressed above is intended to explain the concrete arrangement of the present invention in details with reference to one of the best modes for carrying out the invention, but the invention is not limited by this embodiment. It should be understood by technicians in this field that embodiments of the present invention can be modified or equivalently replaced without departing from the spirit and scope of this invention which shall be all included in the claims of the invention.

What is claimed is:

1. A system of producing hydrogen and biochar from biomass assisted by an iron and steel slag extract, comprising:

a pretreatment system, wherein the pretreatment system is configured to pretreat the biomass, an iron-based catalyst, and an alkaline reagent, and mix the biomass, the iron-based catalyst, and the alkaline reagent at a stoichiometric specific ratio to obtain a mixed reactant, wherein the pretreatment system further comprises:
an iron-based catalyst collecting system, wherein the iron-based catalyst collecting system comprises:
a pre-washing device, wherein industrial solid waste, minerals, or mine tailings are continuously added and fully mixed with an auxiliary reagent and water at a specific ratio into the pre-washing device to obtain a washed slurry;
a reactor, wherein the washed slurry from the pre-washing device is continuously transferred into the reactor by using a pump unit, carbon dioxide is continuously bubbled into the reactor under a specific pressure in order to be fully mixed and reacted with the washed slurry to obtain a treated slurry, and the treated slurry is continuously discharged from the reactor;
a multistage solid-liquid separator, wherein the multistage solid-liquid separator is configured to perform a solid-liquid separation on the treated slurry continuously discharged from the reactor to obtain a filtrate, wherein unreacted solids obtained by the solid-liquid separation are recycled as feedstock into a next stage of reaction and separation; and
a purifier, wherein besides target ions of calcium and magnesium, the filtrate from the multistage solid-liquid separator further contains impurity ions comprising ions, the filtrate from the multistage solid-liquid separator is continuously transferred into the purifier, the impurity ions are removed from the filtrate via a precipitation by physically and/or chemically changing a pH value of the filtrate to obtain an iron-containing precipitate, and the iron-based catalyst is obtained by collecting the iron-containing precipitate; and
an alkaline reagent separation system, wherein the alkaline reagent separation system comprises:
a product preparation unit, wherein the product preparation unit is configured to produce a Ca/Mg-based product based on the filtrate containing the target ions of calcium and magnesium obtained by the multistage solid-liquid separator; and
a thermal decomposition unit, wherein the Ca/Mg based product is calcined and decomposed in the thermal decomposition unit to form a Ca/Mg alkaline reagent;
a thermal reactor, wherein the thermal reactor is configured to allow the mixed reactant to fully react;
a solid residue collector, wherein the solid residue collector is in communication with a discharge outlet of the thermal reactor, and the solid residue collector is configured to collect solid residue produced in a reaction from the thermal reactor; and
a gas collection system, wherein the gas collection system is in communication with an exhaust port of the thermal reactor, and the gas collection system is configured to collect a hydrogen-based gas produced in the reaction from the thermal reactor.

2. The system according to claim 1, wherein the pretreatment system further comprises a biomass dehydration treatment unit to adjust the moisture content of the biomass.

3. The system according to claim 1, wherein the pretreatment system is further configured to reduce the iron-based catalyst in the hydrogen at 500° C. for 2 hours.

4. The system according to claim 1, wherein the biomass and the alkaline reagent are mixed according to the specific stoichiometric ratio, and an amount of the iron-based catalyst added in a reaction is between 5% and 15% by weight of a total mass of the biomass and the alkaline reagent.

5. The system according to claim 1, wherein the thermal reactor is further configured to fully react the mixed reactant either at 500° C. for 1 hour or at 300° C. for 2 hours.

6. The system according to claim 5, wherein additional steam is needed for keeping a humidity of a reaction environment between 10% and 30% when the biomass is relatively dry.

7. The system according to claim 1, wherein the solid residue is a mixture of the biochar, calcium magnesium carbonate, and the iron-based catalyst.

8. The system according to claim 7, further comprising an iron-making sintering system, wherein the solid residue is mixed with raw materials at a ratio of no more than 30% by weight for a preparation of the raw materials for a sintering and a blast furnace reduction reaction in the iron-making sintering system.

9. The system according to claim 1, further comprising a gas separation and purification system, wherein the gas separation and purification system is configured to separate and purify the hydrogen-based gas collected by the gas collection system to obtain a high-purity hydrogen product.

10. The system according to claim 1, further comprising a mixed gas reuse system, wherein the mixed gas reuse system is configured to collect and transfer the hydrogen-based gas into an iron-making blast furnace for a direct iron ore reduction, engaging in a heating reaction and a reduction reaction.

11. The system according to claim 2, wherein the mixed reactant is fully reacted either at 500° C. for 1 hour or at 300° C. for 2 hours in the thermal reactor.

12. The system according to claim 3, wherein the mixed reactant is fully reacted either at 500° C. for 1 hour or at 300° C. for 2 hours in the thermal reactor.

13. The system according to claim 4, wherein the mixed reactant is fully reacted either at 500° C. for 1 hour or at 300° C. for 2 hours in the thermal reactor.

14. The system according to claim 2, wherein the solid residue is a mixture of the biochar, calcium magnesium carbonate, and the iron-based catalyst.

15. The system according to claim 3, wherein the solid residue is a mixture of the biochar, calcium magnesium carbonate, and the iron-based catalyst.

16. The system according to claim 4, wherein the solid residue is a mixture of the biochar, calcium magnesium carbonate, and the iron-based catalyst.

17. The system according to claim 2, further comprising a mixed gas reuse system, wherein the mixed gas reuse system is configured to collect and transfer the hydrogen-based gas into an iron-making blast furnace for a direct iron ore reduction, engaging in a heating reaction and a reduction reaction.

18. The system according to claim 3, further comprising a mixed gas reuse system, wherein the mixed gas reuse system is configured to collect and transfer the hydrogen-based gas into an iron-making blast furnace for a direct iron ore reduction, engaging in a heating reaction and a reduction reaction.

* * * * *